Feb. 16, 1965   W. HOFFMANN   3,169,618
CENTRIFUGALLY ACTUATED CLUTCH
Filed Jan. 18, 1962   2 Sheets-Sheet 2
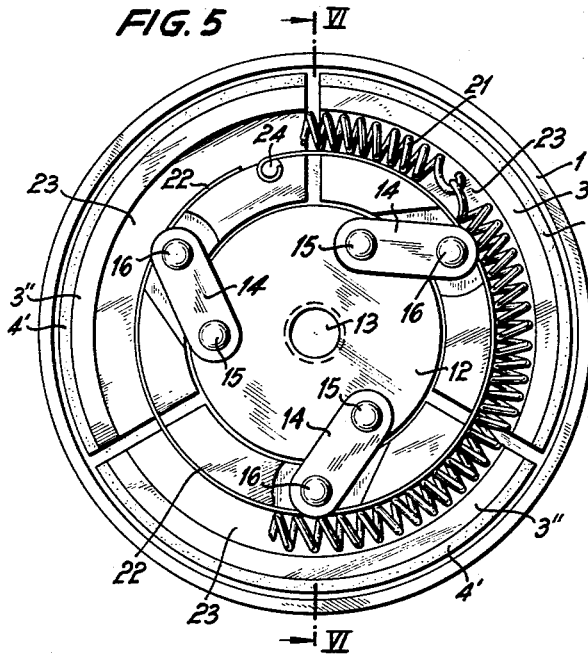
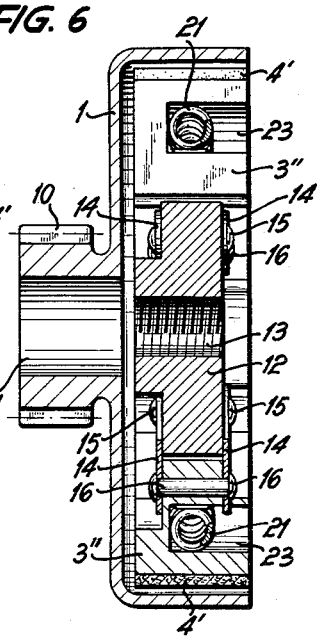
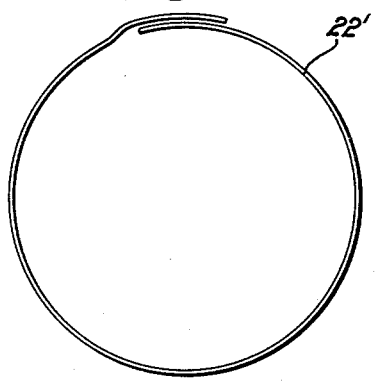
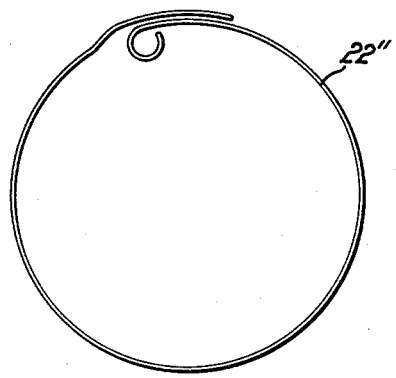
INVENTOR
Willy Hoffmann

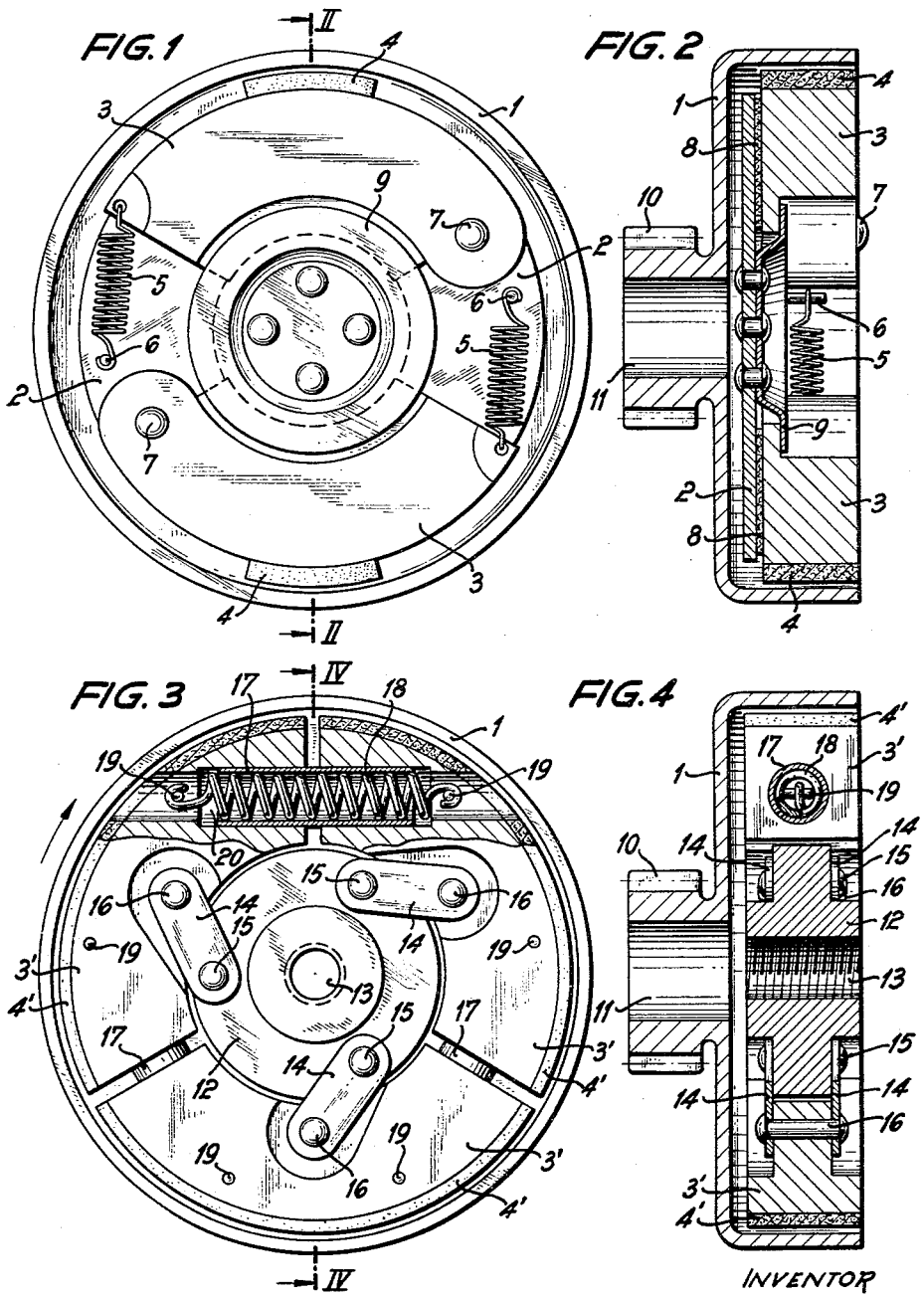

United States Patent Office 3,169,618
Patented Feb. 16, 1965

3,169,618
CENTRIFUGALLY ACTUATED CLUTCH
Willy Hoffmann, Schweinfurt (Main), Germany, assignor to Fichtel & Sachs A.G., Schweinfurt (Main), Germany, a corporation of Germany
Filed Jan. 18, 1962, Ser. No. 166,993
Claims priority, application Germany, Jan. 20, 1961, F 33,012
3 Claims. (Cl. 192—105)

This invention relates to centrifugally actuated clutches, and more particularly to a clutch of a type in which the driving member of the clutch rotates and carries movable coupling members. The coupling members are forced by centrifugal force into frictional engagement with a portion of the wall of the driven clutch member when the driving clutch member rotates at a speed sufficient for the centrifugal force to overcome the restraint of return springs provided to urge the coupling members inward and away from said portion of the wall of the driven member.

Clutches of the afore-described, basically known type are simple and inexpensive. Their field of application has been limited greatly heretofore by the fact that their characteristics as represented by a curve on a chart of driving member speed versus driven member speed lack smoothness and reproducibility.

The friction between the two clutch members, and therefore the transmitted torque, changes abruptly at certain points along the curve. The location of these points of discontinuity varies with the rate of velocity change in the driving member and with other operational variables. It is advantageous in clutches of the type described that the coupling members be entirely out of contact with the driven member when the clutch is disengaged. When the rotary speed of the driving member is increased, the friction between the driving and driven member increases instantaneously at the moment of contact from zero to a finite value. Conversely, the slip of the clutch decreases instantaneously from infinity to a finite value. When the speed of driving and driven member become equal, the slip becomes zero, and the friction between the two members which controls their relative movement is now their starting or static friction, not sliding friction. The change from one type of friction to the other may be quite abrupt when the coupling members move from the inoperative to the engaged position at great speed.

The points of discontinuity in the characteristic curve of the conventional centrifugally actuated friction clutch of the type here discussed may cause vibrations. Engagement of the coupling members with the driven clutch members tends to reduce the rotary speed of the coupling members. If the speed of the driving clutch part becomes low enough to cause the clutch to disengage, the resulting loss of load leads to renewed acceleration of the driving clutch part and to renewed engagement, again causing deceleration of the coupling members and the start of another cycle of similar events. The vibrations set off by such cyclic engagement and disengagement of the clutch, and the cyclic changes in the torque transmitted from the driving to the driven member produce undesirable noise. In severe cases, the sequence of torque pulses may destroy the clutch or a device attached to one of the clutch halves for joint rotation. If the clutch is interposed between the motor and the wheels of a self-propelled vehicle, the pulsed transmission of torque between motor and wheels causes sudden jerking movements of the vehicle. This property of the known centrifugally actuated clutches has until now prevented their use in the automotive field on a substantial scale.

The primary object of this invention is the provision of a centrifugally actuated clutch of the type described which is not subject to pulsed transmission of torque during engagement, and to abrupt changes in torque transmission during normal operation.

Another object is the provision of a smoothly operating clutch which does not compromise the basic simplicity of the known structure in order to avoid its shortcomings.

With these and other objects in view, the invention provides means for frictionally damping the movement of the coupling members. Damping prevents abrupt changes in friction or slip, and also prevents or substantially attenuates any vibrations that may occur in the clutch and associated structure upon clutch engagement. The source of torsional pulses is practicaly eliminated by such damping. Friction means engaging the centrifugally movable coupling members for frictionally opposing their movement relative to the driving clutch member are an essential feature of this invention.

Other objects and features of the invention will become apparent to those skilled in the art as the disclosure is made in the following detailed description of preferred embodiments of the invention as illustrated in the accompanying drawings in which:

FIG. 1 shows a first embodiment of the clutch of the invention in front elevation;

FIG. 2 shows the clutch of FIG. 1 in axial section on the line II—II of FIG. 1;

FIG. 3 shows a modified clutch of the invention in front elevation, a portion of the structure being broken away to reveal certain working elements;

FIG. 4 is an axially sectional view of the clutch of FIG. 3, the section being taken on line IV—IV of FIG. 3;

FIG. 5 illustrates a third embodiment of the invention in front elevation;

FIG. 6 shows the apparatus of FIG. 5 in axial section on the line VI—VI of FIG. 5; and FIGS. 7 and 8 respectively show modifications of a friction member of the clutch of FIGS. 5 and 6.

Referring now to the drawings there is shown in FIGS. 1 and 2 a centrifugally actuated clutch the output or driven member 1 of which is a casing of substantially cylindrical cup shape. It carries a coaxial integral sleeve 11 equipped with a gear rim 10 to which apparatus driven by the clutch may be geared.

The input or driving member of the clutch is a circular plate 2 coaxial with the cup-shaped casing 1 and received within the cavity of the casing. Rotation of the plate 2 is normally effected by a non-illustrated shaft coaxially passing through the bore of the sleeve 11 and journaled therein. The shaft may be fastened to the plate 2 in any desired manner.

Two coupling members 3 somewhat similar in appearance and action to a conventional type automotive brake shoes are pivoted by pins 7 to diametrically opposite portions of the plate 2. They each carry a friction facing 4 on their circularly arcuate outer circumference, and urge the friction facing into contact with the inner wall of the casing 1 when centrifugal force pivots the coupling members 3 in an outward direction.

Such outward pivoting movement is opposed by two helical return springs 5. The ends of each spring are fastened under tension to a stud 6 on the plate 2, and to a free end portion of a corresponding coupling member 3, the latter being formed with an opening in which the hook-shaped end of the spring is engaged.

A flat friction lining 8 is interposed between each coupling member 3 and the plate 2, and the coupling members 3 are urged against the friction lining 8 by a dished plate spring 9 the central bottom of which is riveted to the plate 2 whereas its outer flange engages a shoulder on each coupling member 3. The linings 8 are fastened to the plate 2, but may be attached instead to the corresponding coupling members 3.

The afore-described clutch operates as follows:

When standing still, the several elements of the clutch assume the positions illustrated in the drawing in which the friction facings 4 are spaced from the inner wall of the casing 1. Rotation of the plate 2 by the non-illustrated shaft does not change the relative position of the coupling members 3 and of the plate 2 until the centrifugal forces tending to pivotally swing the members 3 outward on the pins 7 are sufficient to overcome not only the force of the springs 5, but also the frictional drag of the lining 8 which opposes movement of the coupling members in any direction.

The centrifugal outward movement of the coupling members 3 is therefore frictionally damped, and such damping prevents abrupt changes in the slip of the clutch such as would occur when the coupling members 3 were free to move outward only against the force of the springs 5. The frictional damping of coupling member movement is also effective in preventing vibrations of any significant amplitude to be set up when the load on the driven member is sufficient to reduce the speed of the driving member and of a motor driving it during clutch engagement. The clutch engages and disengages smoothly without sudden changes in transmitted torque.

The clutch illustrated in FIGS. 3 and 4 in front elevation and in axial section respectively has three coupling members 3', each having the shape of a segment of a flat ring extending over about one third of the inner wall of a casing 1 identical with the casing shown in FIG. 1. The outer faces of the coupling members 3' are covered by friction facings 4'.

The coupling members 3' are fastened to a central hub 12 provided with an axial threaded bore 13 in which a shaft driving the clutch may be secured. Three pairs of links or lugs 14 are pivoted to the hub 12 by respective pivot pins 15, each pin holding a lug on two opposite radial faces of the hub. The pins 15 are offset 120° from ecah other. The free end of each link 14 is connected to a coupling member 3' by another pivot pin 16 which passes through a corresponding axial opening in the central portion of the respective coupling member 3'.

Straight aligned bores 20 extend inwardly from two opposite radial faces of each pair of circumferentially adjacent coupling members 3', and a straight tubular sleeve 17 is inserted in both aligned bores 20 in frictional engagement with the walls of the bores. A helical tension spring 18 is partially received within the bore of the tubular sleeve 17. Its ends extend outward of the sleeve into the bores 20 and are fastened to the coupling members 3' by pins 19.

The clutch illustrated in FIGS. 3 and 4 operates substantially in the same manner as the aforedescribed clutch shown in FIGS. 1 and 2, except that the coupling members 3 of the modification of FIGS. 1 and 2 swing about a pivoted end, whereas the coupling members 3' of FIGS. 3 and 4 perform a substantially translatory swinging movement. Damping of coupling member motion is provided by the frictional engagement of the sleeves 17 in the corresponding bores 20.

The linkage provided by the lugs 14 between the hub 12 and the coupling members 3' provides the clutch of FIGS. 3 and 4 with a very advantageous safety feature. If the driving motor should stall while the wheels or other elements connected to the casing 1 are rotating in the direction of the arrow in FIG. 3, the driving half of the clutch is taken along by the driven half only up to a speed determined by the dimensions and other design factors of the clutch. At relative speeds of the clutch halves higher than this design speed, the clutch slips when the engine stalls. The linkage of the coupling members to the hub 12 shown in FIGS. 3 and 4 also avoids uneven wear of the friction facings 4'.

The third embodiment of the invention illustrated in FIGS. 5 and 6 is equipped with three coupling members 3" linked to a central hub 12 by means of lugs 14 hingedly fastened to the hub and respective coupling members in the same manner as shown in FIGS. 3 and 4. The three coupling members 3" are formed with respective arcuate grooves 23 which jointly constitute a circular channel about the axis of the clutch. A helical spring 21 the two ends of which are connected to form a closed loop is inserted into the circular channel under tension, and urges the coupling members 3" inward toward the clutch axis. A ribbon 22 of automotive friction lining material is interposed between the spring 21 and the wall of the circular channel against which the resilient pressure of the spring 21 is directed, thereby forcing the ribbon 22 into frictional engagement with the channel wall.

The ribbon is of a material of sufficient stiffness not to buckle during its deformation by the outward movements of the coupling members 3". One end of the ribbon 22 is fastened to one of the coupling members by a pin 24, and the ribbon extends almost in a full circle about the coupling members 3". The free end of the ribbon 22 thus is in frictional contact in all operative positions of the clutch with the same coupling member 3" to which the other ribbon end is fastened by the pin 24.

The mode of operation of the clutch shown in FIGS. 5 and 6 is similar to that of the afore-described clutches of the invention. Outward movement of the coupling members 3" is opposed by the spring 21 and by frictional contact with the ribbon 22. Inward movement of the coupling members 3" causes relative circumferential movement of the ribbon 22 and of the three coupling members, and thus is also damped.

Modifications of a ribbon of friction lining material for use with the clutch of FIGS. 5 and 6 are illustrated in FIGS. 7 and 8. The ribbon 22' seen in FIG. 7 does not require fastening to a coupling member. It is of sufficient length that its two ends overlap in all clutch positions. The friction ribbon 22' always forms a full circle about the coupling members.

The ribbon 22" illustrated in FIG. 8 combines features of the ribbons 22 and 22' in that its ends overlap, and one of the ends is formed into a loop for fastening to a coupling member 3" by a pin 24. It will be appreciated that the amount of damping obtained by the several type of ribbons increases from ribbon 22 to ribbon 22' to ribbon 22" under otherwise equivalent conditions.

Other modifications are contemplated and may obviously be resorted to by those skilled in the art without departing from the spirit and scope of the invention as hereinafter defined by the appended claims, as only preferred embodiments thereof have been disclosed.

What is claimed is:
1. A centrifugally actuated clutch comprising
 (a) a driving member having an axis and being mounted to rotate about said axis,
 (b) a driven member rotatable about said axis,
 (c) a plurality of coupling members in a substantially adjacent and circular relationship, each of said coupling members being provided with an arcuate groove, said grooves forming jointly an annular channel having an inner wall portion directed toward said axis,
 (d) pivot means pivoting said coupling members to said driving member so as to allow said coupling members, during rotation of said driving member and upon development of centrifugal forces, to swing outwardly and inwardly in different directions into frictional engagement with said driven member.
 (e) resilient means provided to act on said coupling members in opposition to said centrifugal forces and thus to urge said coupling members to swing inwardly or backwardly, said resilient means including a tension spring member received in said annular channel and forming a loop therein, and

(f) friction means engaging said coupling members for frictionally retarding the swinging outward and inward movements of said coupling members, said friction means including an elongated friction member circularly received in said channel to be in contact with said inner wall portion.

2. The clutch according to claim 1, wherein said friction member has two end portions, said end portions overlapping each other.

3. The clutch according to claim 1, wherein said friction member has a longitudinal end portion secured to one of said coupling members.

References Cited by the Examiner
UNITED STATES PATENTS

| | | |
|---|---|---|
| 1,715,351 | 6/29 | Bruckman. |
| 2,027,970 | 1/36 | Gillies. |
| 2,038,450 | 4/36 | Roesch. |
| 2,596,193 | 5/52 | Zieg. |
| 2,967,597 | 1/61 | Binder. |

DAVID J. WILLIAMOWSKY, *Primary Examiner.*

THOMAS J. HICKEY, *Examiner.*